United States Patent [19]

Ueda et al.

[11] Patent Number: 5,209,985
[45] Date of Patent: May 11, 1993

[54] ANTISTATIC PLASTIC FILM

[75] Inventors: Eiichi Ueda; Masahito Takada, both of Hino, Japan

[73] Assignee: Konica Corporation, Tokyo, Japan

[21] Appl. No.: 727,062

[22] Filed: Jul. 8, 1991

[30] Foreign Application Priority Data

Jul. 10, 1990 [JP] Japan .................................. 2-181852

[51] Int. Cl.⁵ ............................................. B30B 27/08
[52] U.S. Cl. .................................... 428/518; 430/533; 428/520
[58] Field of Search ......................... 430/533; 428/518

[56] References Cited

U.S. PATENT DOCUMENTS 4,287,298  9/1981  Dodwell .............................. 430/533

Primary Examiner—Edith Buffalow
Attorney, Agent, or Firm—Frishauf, Holtz, Goodman & Woodward

[57] ABSTRACT

An antistatic plastic film is disclosed. The film comprises a plastic base film and provided thereon a layer containing a polyvinylidene chloride and an antistatic layer containing an ionic polymeric compound in that order.

11 Claims, No Drawings

ANTISTATIC PLASTIC FILM

FIELD OF THE INVENTION

The present invention relates to an antistatic plastic film having superior antistatic properties and superior adhesion properties to a coating layer formed on plastic film.

BACKGROUND OF THE INVENTION

In general, plastic films so strongly tend to be statically charged that their use may be greatly restricted in many instances. For example, in the case of light-sensitive silver halide photographic materials, supports made of polyester are commonly used, which tend to be statically charged particularly under conditions of low humidity as in the winter. It is particularly important to take a measure for antistatic, when in recent years high-speed photographic emulsions are coated at a high speed or light-sensitive materials with high sensitivity are exposed to light through automatic printers.

Once a light-sensitive material has been statically charged, static marks may occur because of release of the stored energy, or foreign matters such as dust may be attracted to cause occurrence of pin holes, resulting in a serious deterioration of product quality. Its restoration brings about a great lowering of workability.

Methods of preventing plastic films from being statically charged can be exemplified by a method in which an anionic compound such as an organic sulfonate or an organic phosphate is incorporated, a method in which a metal compound is deposited, and a method in which an anionic compound, a cationic compound or what is called conductive particles are coated. The method in which an anionic compound is incorporated in plastic films enables inexpensive manufacture, but can not achieve a sufficient antistatic effect. It also requires use of a low-molecular compound as a compound usable together with the anionic compound. Hence this method has the problems that the adhesion between a film and a layer formed thereon in a laminate may be lowered because of blooming, the film has no water resistance, and the compound may be transferred to the film. The method in which a metal compound is deposited to the films can achieve superior antistatic properties, and in recent years has come into wide use for providing transparent conductive films. This method, however, has a problem of a high production cost.

The method in which conductive carbon or conductive metal particles are coated can bring about relatively good results and low coast, but may cause a deterioration of transparency of films.

Under such circumstances, it is common to use a method in which an anionic compound or a cationic compound is coated on a plastic film.

For example, in light-sensitive materials, fluorine-containing surface active agents, cationic surface active agents, amphoteric surface active agents, surface active agents or polymeric compounds containing a polyethylene oxide group, polymers having a sulfonic acid or phosphoric acid group in the molecule, and so forth have been recently used as antistatic agents.

In particular, methods of adjusting triboelectric series by the use of fluorine-containing surface active agents or improving conductivity by the use of conductive polymers have been widely used. For example, Japanese Patent Publications Open to Public Inspection (hereinafter referred to as Japanese Patent O.P.I. Publication(s)) No. 91165/1974 and No. 121523/1974 disclose an example in which an ion type polymer having a dissociative group in the main polymer chain is used.

In these conventional methods, however, antistatic properties may be greatly deteriorated when developing is carried out. This is presumed to be due to a loss of antistatic properties as a result of the processing carried out through the steps such as developing using an alkali, fixing in an acidic environment, and washing. Hence, problems may arise such that pinholes are produced because of adhesion of dust in such an instance in which a film having been processed is further brought to printing as in the case of printing light-sensitive materials.

Taking account of such problems, Japanese Patent O.P.I. Publications No. 84658/1980 and No. 174542/1986 propose to provide an antistatic layer comprising i) a hydrophobic polymer containing a carboxyl group and ii) a polyfunctional aziridine. This method makes it possible to retain antistatic properties even after the processing. This antistatic layer, however, may cause the problem that an adhesion between a plastic film, e.g., a polyester film, and a hydrophilic colloid layer such as the antistatic layer formed thereon by coating is so poor that peel-off or delamination occurs during the processing in an aqueous solution, e.g., a developing solution as in the case of the processing of light-sensitive materials.

SUMMARY OF THE INVENTION

To overcome the above problems, an object of the present invention is to provide an antistatic plastic film having superior antistatic properties, in particular, causing no deterioration of adhesion properties even in instances in which a hydrophilic layer is formed thereon as in the case of light-sensitive materials and also processing is carried out using an aqueous solution.

The above object of the present invention can be achieved by an antistatic plastic film comprising a plastic base film and provided thereon a layer containing a polyvinylidene chloride and an antistatic layer containing an ionic polymeric compound in that order.

DETAILED DESCRIPTION OF THE INVENTION

The present invention will be described below in detail.

In the present invention, as described above, a polyvinylidene chloride layer with water resistance is interposed between an antistatic layer and a plastic base film, which can be effective for improving the adhesion between the plastic base film and the coating layer provided thereon.

The ionic polymeric substance used in the present invention may include anionic polymeric compounds as disclosed in Japanese Patent Examined Publications No. 23828/1974, No. 23827/1974 and No. 28937/1972; ionene type polymers having a dissociative group in the main chain, as disclosed in Japanese Patent O.P.I. Publication no. 54672/1975 and Japanese Patent Examined Publications No. 14735/1984, No. 18175/1982, No. 18176/1982 and No. 56059/1982, etc; cationic polymeric compounds having a cationic dissociative group in the side chain, as disclosed in Japanese Patent Examined Publications No. 13223/1978 and No. 15376/1982, Japanese Patent O.P.I. Publications No. 45231/1978, No. 145783/1980, No. 65950/1980, No. 67746/1980, No. 11342/1982 and No. 19735/1982, and Japanese Patent Examined Publication No. 56858/1983.

Particularly preferred ionic polymeric compounds may include polymers having a unit with the structure represented by the following Formula I, II-A or II-B.

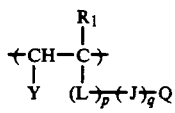

Formula I

In the formula $R_1$ represents a hydrogen atom, an alkyl group having 1 to 4 carbon atoms, a halogen atom or $-CH_2COO^{\ominus}M^{\oplus}$.

Y represents $-COO^{\ominus}M^{\oplus}$ or a hydrogen atom.

L represents $-CONH-$, $-COO-$ or $-O-$.

J represents a substituted or unsubstituted alkylene group having 1 to 12 carbon atoms, or a divalent group having an arylene group, alkylenearyl group or an arylenealkylene group.

Q represents an ionic group having a cationic dissociative group or an anionic dissociative group, as exemplified by $-O^{\ominus}M^{\oplus}$, $-SO_3^{\ominus}M^{\oplus}$,

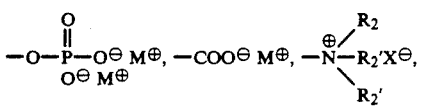

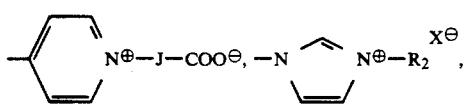

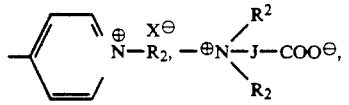

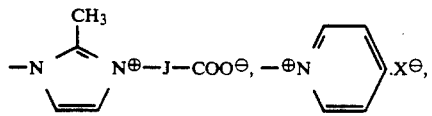

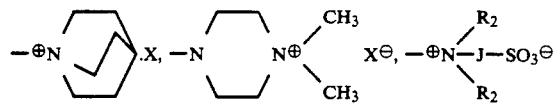

M represents a hydrogen atom or a cation.

$R_2$ and $R_2'$ each represent a substituted or unsubstituted alkyl group having 1 to 4 carbon atoms, and preferably a methyl group, an ethyl group and a propyl group.

p and q are each an integer of 0 or 1.

X represents an anion.

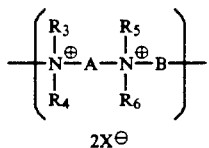

Formula II-A

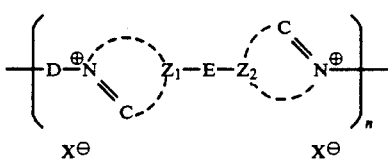

Formula II-B

In the formulas, $R_3$, $R_4$, $R_5$ and $R_6$ each represent a a substituted or unsubstituted alkyl group having 1 to 4 carbon atoms, where $R_4$ and $R_6$ may combine to form a nitrogen-containing heterocyclic ring. A, B and D each represent a substituted Or unsubstituted alkylene group having 2 to 10 carbon atoms, where the alkylene group may have an arylene group at its middle portion, an arylene group, an alkenylene group, an arylenealkylene group, an alkylenearylene group, $-R_7COR_8-$, $-R_9COOR_{10}OCOR_{11}-$, $-R_{12}OCOR_{13}COOR_{14}-$, $-R_{15}-(-OR_{16}-)_m-$, $-R_{17}CONHR_{18}NHCOR_{19}$, $-R_{20}OCONHR_{21}NHCOR_{22}$ or $-R_{23}NHCONHR_{24}NHCONHR_{25}$. $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represents an alkylene group, and $R_{10}$, $R_{13}$, $R_{18}$, $R_{21}$ and $R_{24}$ each represent a connecting group selected from a substituted or unsubstituted alkylene group, an alkenylene group, an arylene group, an arylenealkylene group and an alkylenearylene group. m represents an integer of 1 to 4. $X^{\ominus}$ represents an anion.

In the above, when A is an alkylene group, a hydroxyalkylen group or an arylenalkylene group, it is preferred for B not to be an alkylene group, a hydroxyalkylene group or an arylenealkylene group.

E represents a mere bond arm, $-NHCOR_{25}CONH-$ or a group selected from what are represented by D. $R_{25}$ represents a substituted or unsubstituted alkylene group, an alkenylene group, an arylene group, an arylenealkylene group or an alkylenearylene group.

$Z_1$ and $Z_2$ each represent a group of non-metal atoms necessary to complete a ring of 5 or 6 members, which may be connected to E in the form of a quaternary salt represented by

The symbol n represents an integer of 5 to 300.

Examples of preferred ionic polymeric compounds having the unit of the structure represented by Formula I, II-A or II-B are shown below.

Examples of preferred ionic polymeric compounds having the unit of the structure represented by Formula II-A or II-B:

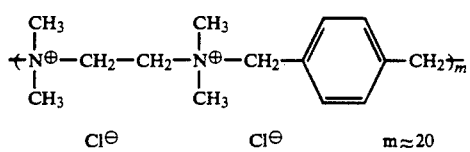

IP-1

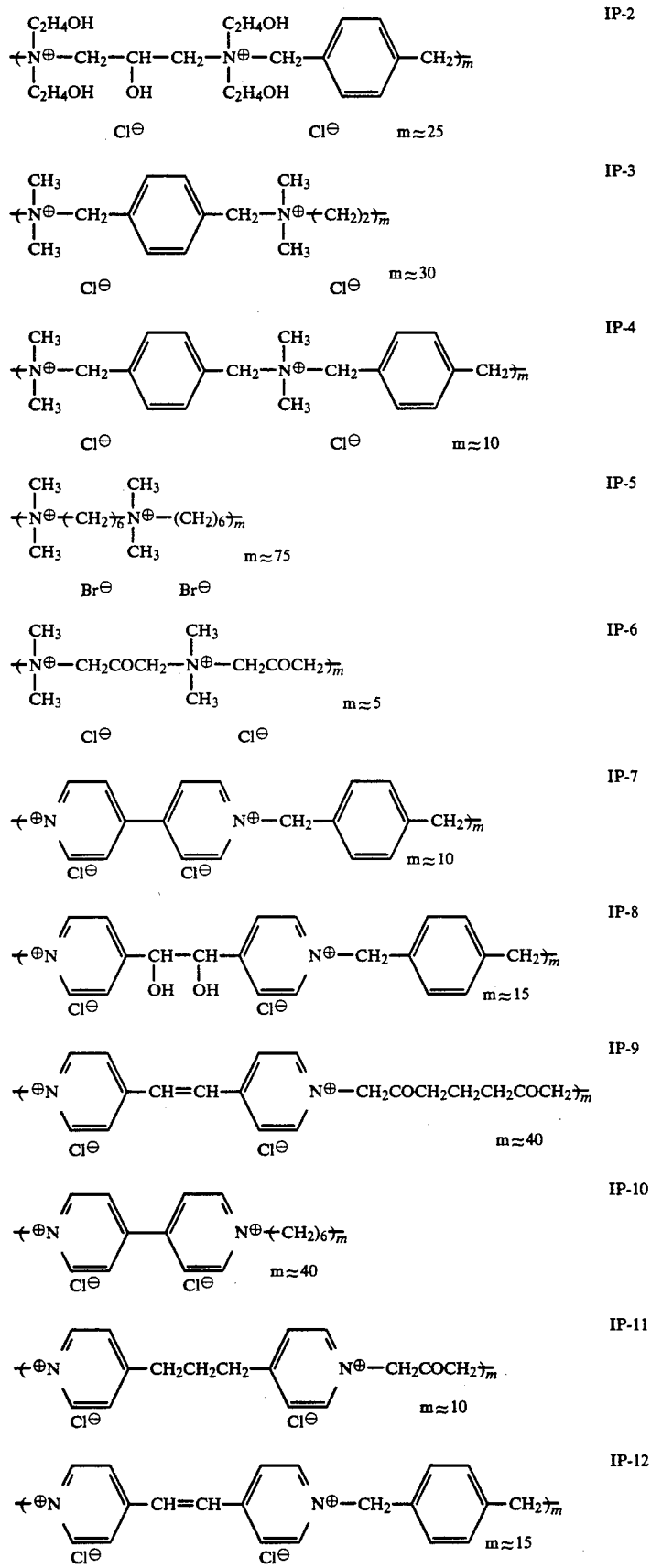

-continued
IP-13
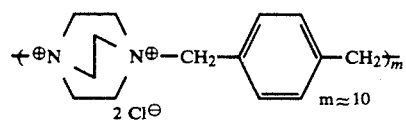
IP-14
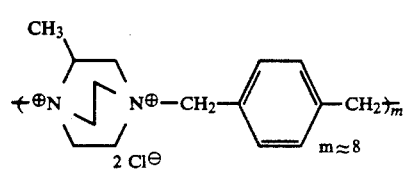
IP-15
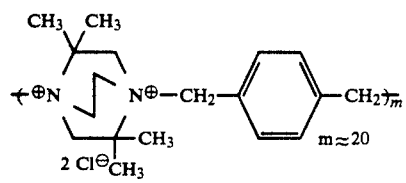
IP-16
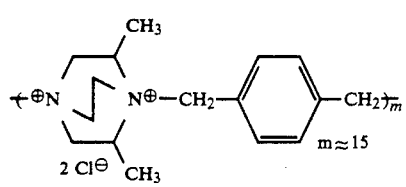
IP-17
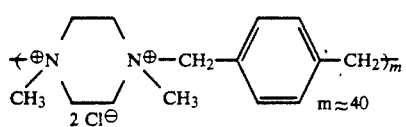
IP-18
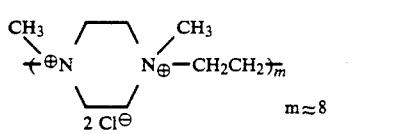
IP-19
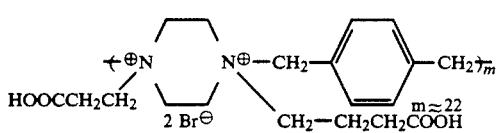
IP-20
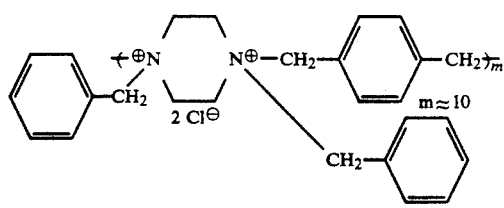
IP-21
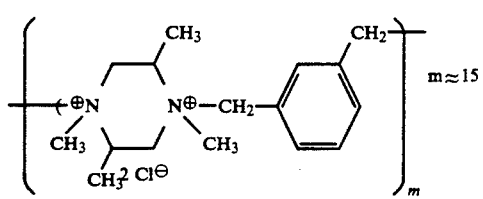

Examples of preferred ionic polymeric compounds having the unit of the structure represented by Formula I:
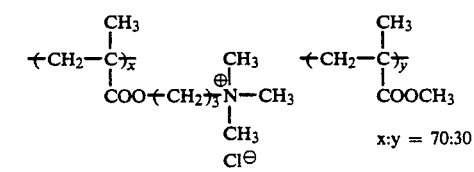
IP-22
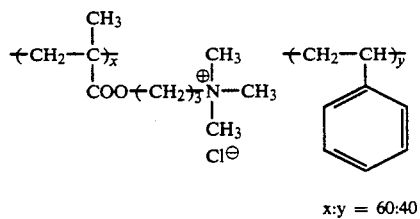
IP-23
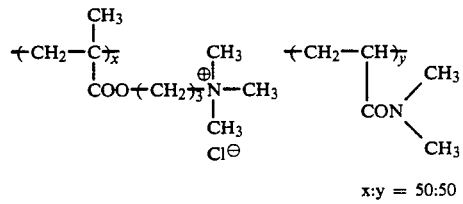
IP-24
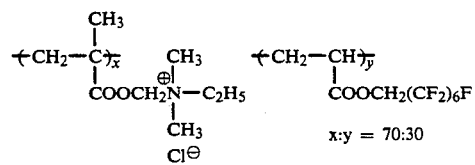
IP-25
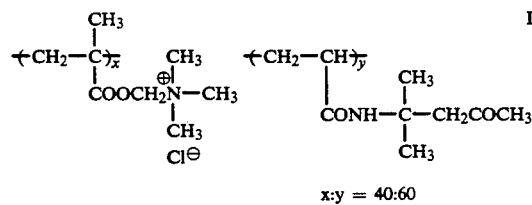
IP-26
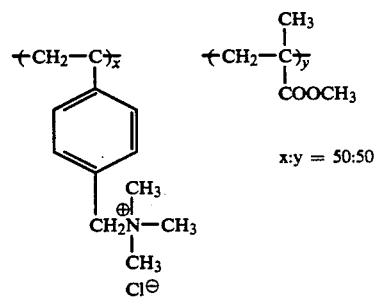
IP-27
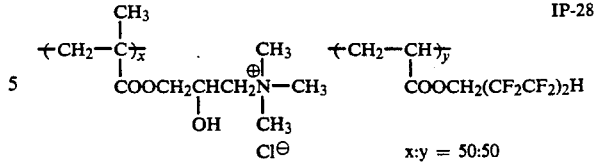
IP-28
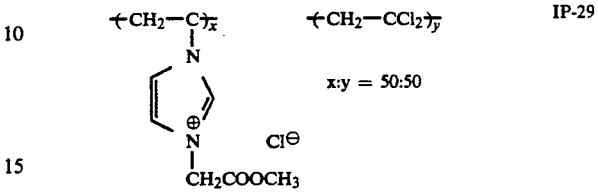
IP-29
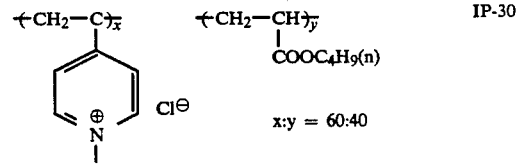
IP-30
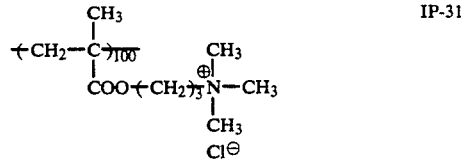
IP-31
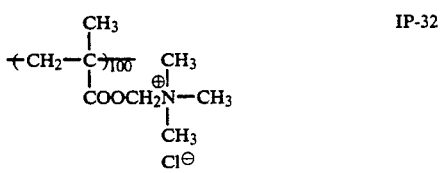
IP-32
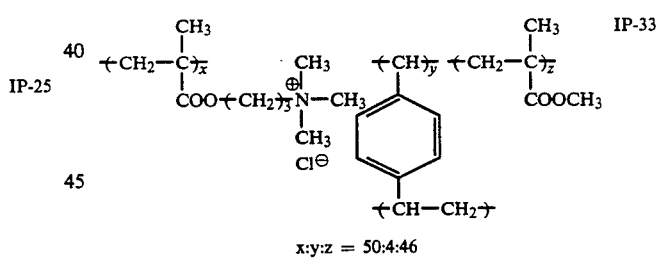
IP-33
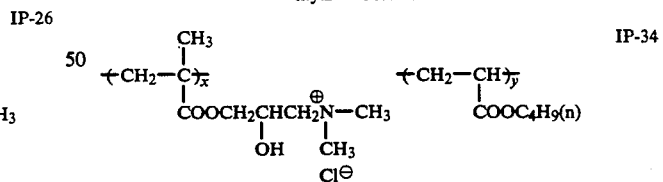
IP-34
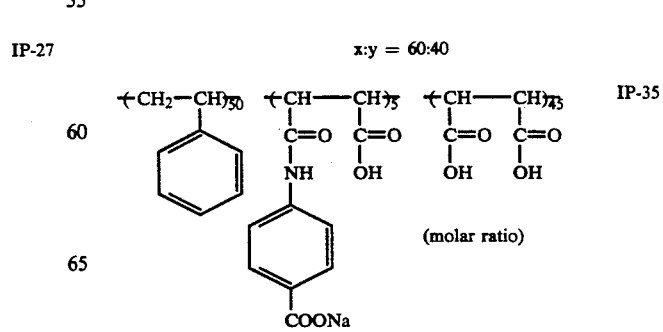
IP-35

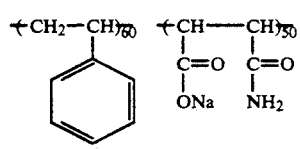 IP-36
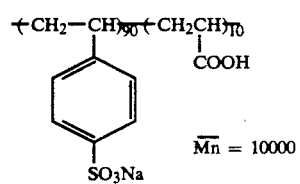 A-1
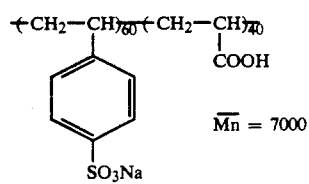 A-2
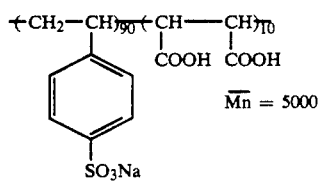 A-3
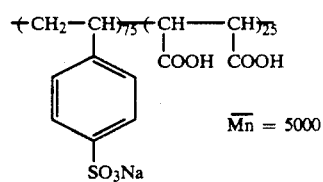 A-4
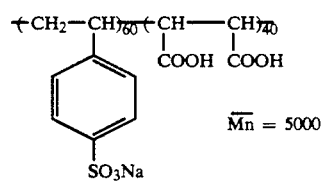 A-5
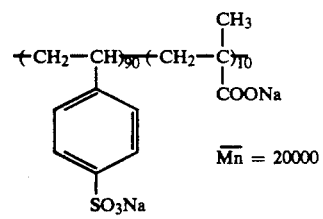 A-6
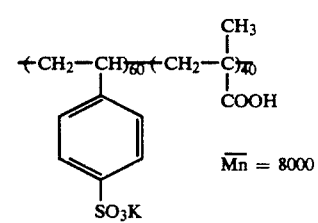 A-7
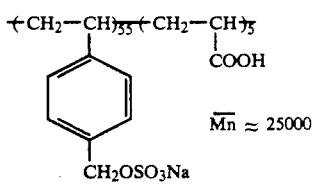 A-8
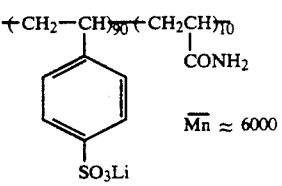 A-9
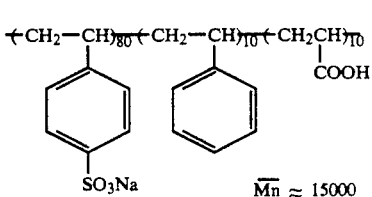 A-10
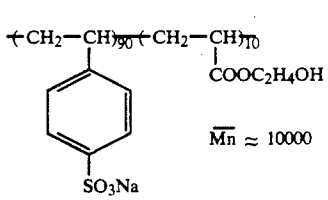 A-11
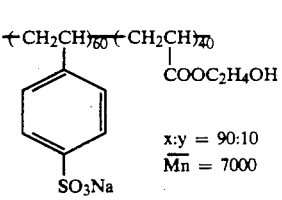 A-12
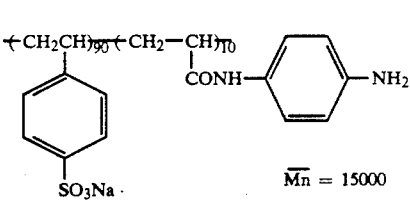 A-13
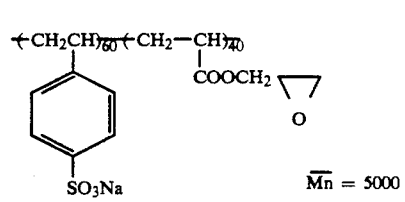 A-14
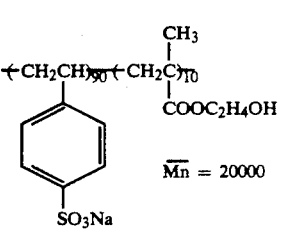 A-15

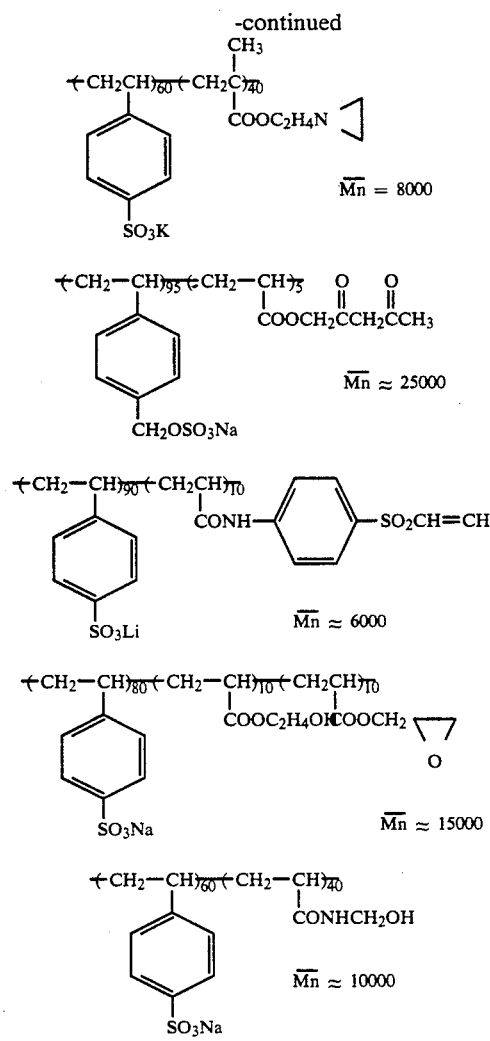

In the above A-1 to A-20, Mn represents an average molecular weight (in the present specification, the average molecular weight refers to number average molecular weight), which is expressed by a value measured by GPC, in terms of polyethylene glycol.

The ionic polymeric compound described above may be used alone or in combination of several kinds of ion-conductive substances. Such an ionic polymeric compound may preferably be used in an amount ranging from 0.005 g/m² to 2.0 g/m². It may more preferably be used in an amount ranging from 0.01 g/m² to 1.0 g/m².

The polyvinylidene chloride layer that constitutes the antistatic plastic film of the present invention comprise a vinylidene chloride copolymer. The vinylidene chloride copolymer may include copolymers containing vinylidene chloride in an amount of 70 % by weight to 99.5 % by weight, and preferably 85 % by weight to 99 % by weight; copolymers comprised of vinylidene chloride, an acrylate and a vinyl monomer having an alcohol on the side chain, as disclosed in Japanese Patent O.P.I. Publication No. 135526/1976; copolymers comprised of vinylidene chloride, an alkylacrylate and acrylic acid, as disclosed in U.S. Pat. No. 2,852,378; copolymers comprised of vinylidene chloride, acrylonitrile and itaconic acid, as disclosed in U.S. Pat. No. 2,698,235; and copolymers comprised of vinylidene chloride, an alkylacrylate and itaconic acid, as disclosed in U.S. Pat. No. 3,778,856. They may specifically include the compounds exemplified in the following:

The numerals in parentheses indicate weight ratio.

Vinylidene chloride/methyl acrylate/hydroxyethyl acrylate (86:12:2) copolymer

Vinylidene chloride/ethyl methacrylate/hydroxypropyl acrylate (82:10:8) copolymer Vinylidene chloride/hydroxydiethyl methacrylate (92:8) copolymer Vinylidene chloride/butyl acrylate/acrylic acid (94:4:2) copolymer Vinylidene chloride/butyl acrylate/itaconic acid (75:20:5) copolymer Vinylidene chloride/methyl acrylate/itaconic acid (90:8:2) copolymer Vinylidene chloride/methyl acrylate/methacrylic acid (93:4:3) copolymer Vinylidene chloride/monoethyl itaconate (96:4) copolymer Vinylidene chloride/acrylonitrile/acrylic acid (95:3.5:1.5) copolymer Vinylidene chloride/methyl acrylate/acrylic acid (90:5:5) copolymer Vinylidene chloride/ethyl acrylate/acrylic acid (92:5:2) copolymer Vinylidene chloride/methyl acrylate/3-chloro-2-hydroxypropyl acrylate (84:9:7) copolymer Vinylidene chloride/methyl acrylate/N-ethanolacrylamide (85:10:5) copolymer The antistatic plastic film of the present invention, having the antistatic layer can be used, for example, in supports for light-sensitive materials. The light-sensitive materials are exemplified by light-sensitive silver halide color photographic materials, light-sensitive materials for X-ray photography and light-sensitive materials for lithography.

Silver halide emulsions used in the present invention can be stabilized using, for example, the compounds as disclosed in specifications or publications of U.S. Pat. Nos. 2,444,607, No. 2,716,062 and No. 3,512,982. West Germany Patent Publications No. 11 89 380, No. 20 58 626 and No. 21 18 411. Japanese Patent Examined Publication No. 4133/1968, U.S. Pat. No. 3,342,596. Japanese Patent Examined publication No. 4417/1972, West Germany Patent Publication No. 21 49 789, Japanese Patent Examined Publication No. 2825/1964 and Japanese Patent Examined Publication No. 13566/1974, which are preferably exemplified by 5,6-trimethylene-7-hydroxy-S-triazolo(1,5-a)pyrimidine, 5,6-tetramethylene-7-hydroxy-S-triazolo(1,5-a)pyrimidine, 5-methyl-7-hydroxy-S-triazolo(1,5-a)pyrimidine, 7-hydroxy-S-triazolo(1,5-a)pyrimidine, 5-methyl-6-bromo-7 hydroxy-S-triazolo(1.5-a)pyrimidine, gallic acid esters as exemplified by isoamyl gallate, dodecyl gallate, propyl gallate and sodium gallate, mercaptanes such as 1-phenyl-5-mercaptotetrazole and 2-mercaptobenzothiazole, benzotriazoles such as 5-bromobenzotriazole and 5-methylbenzotriazole, and benzoimidazoles such as 6-nitrobenzoimidazole.

The light-sensitive silver halide photographic material according to the present invention and/or a developing solution therefor may contain an amino compound.

For the purpose of improving developability, a developing agent such as phenidone or hydroquinone and a restrainer such as benzotriazole may be incorporated into the emulsion side, or, for the purpose of improving a processing power of processing solutions, the developing agent or restrainer may be incorporated into a backing layer.

A hydrophilic colloid particularly preferably usable in the present invention is a gelatin.

The gelatin used in the present invention may be any of those having been alkali-treated or acid-treated. In instances in which ossein gelatin is used, it is preferred to remove calcium or iron content. A preferred calcium content is 1 ppm to 999 ppm, and more preferably 1 ppm to 500 ppm. A preferred iron content is 0.01 ppm to 50 ppm, and more preferably 0.1 ppm to 10 ppm. The controlling of the quantities of calcium content and iron content in this way can be achieved by passing an aqueous gelatin solution through an ion-exchange apparatus.

The developing agent used in developing the light-sensitive silver halide photographic material according to the present invention may include catechol, pyrogallol and derivatives thereof, ascorbic acid, chlorohydroquinone, bromohydroquinone, methylhydroquinone, 2,3-dibromohydroquinone, 2,5-diethylhydroquinone, 4-chlorocatechol, 4-phenylcatechol, 3-methoxycatechol, 4-acetyl-pyrogallol and sodium ascorbate.

Developing agents of a $HO-(CH=CH)_n-NH_2$ type, a $H_2N-(CH=CH)_n-NH_2$ type and a heterocyclic type may be used in the present invention.

The $HO-(CH=CH)_n-NH_2$ type developing agent may typically include ortho aminophenol and para-aminophenol, as exemplified by 4-aminophenol, 2-amino-6-phenylphenol, 2-amino-4-chloro-6-phenylphenol and N-methyl-p-aminophenol.

The $H_2N-(CH=CH)_n-NH_2$ type developing agent may include, for example, 4-amino-2-methyl-N,N-diethylaniline, 2,4-diamino-N,N-diethylaniline, N-(4-amino-3-methylphenyl)morpholine and p-phenylenediamine.

The heterocyclic type developing agent may include 3-pyrazolidones such as 1-phenyl-3-pyrazolidone, 1-phenyl-4,4-dimethyl-3-pyrazolidone and 1-phenyl-4-methyl-4-hydroxymethyl-3-pyrazolidone, 1-phenyl-4-amino-5-pyrazolidone, and 5-aminouracyl.

The developing agents as disclosed in The Theory of the Photographic Process, Fourth Edition, pp.291-334 and Journal of the American Chemical Society, Vol. 73, p.3,100 (1951) can be effectively used in the present invention. These developing agents may be used either alone or in combination. They may more preferably be used in combination of two or more kinds. In a developing solution usable in developing the light-sensitive material according to the present invention, a sulfite as exemplified by sodium sulfite or potassium sulfite may be used as a preservative. The effect of the present invention can not be lost because of its use. A hydroxylamine or hydrazide compound may also be used. In this instance, it may preferably be used in an amount of 5 g to 500 g, and more preferably 20 g to 200 g, per liter of the developing solution.

The developing agent may also contain a glycol as an organic solvent. Such a glycol may include ethylene glycol, diethylene glycol, propylene glycol, triethylene glycol, 1,4-butanediol and 1,5-pentanediol. Diethylene glycol is preferably used. These glycols may be used in an amount of preferably 5 g to 500 g, and more preferably 20 to 200 g, per liter of the developing solution. These organic solvents may be used alone or in combination.

The light-sensitive silver halide photographic material according to the present invention may be processed using the developing solution containing the development restrainer as described above, whereby light-sensitive materials with a superior storage stability can be obtained.

The developing solution composed as described above may preferably have a pH value of 9 to 13. From the viewpoint of preservativity and photographic performances, the pH value may more preferably be in the range of 10 to 12. With regard to cations present in the developing solution, potassium ions may preferably be present in a higher percentage than sodium ions so that the activity of the developing solution can be increased.

The light-sensitive silver halide photographic material according to the present invention can be precessed under various conditions. The processing may preferably be carried out, for example, at a developing temperature of not higher than 50° C., and particularly preferably about 25° C. to about 40° C. The developing may commonly be completed in a time not longer than 2 minutes. It may particularly preferably be completed in 10 seconds to 50 seconds, whereby good results can be often brought about. Processing steps other than the developing may be optionally used, as exemplified by washing, stopping, stabilizing, fixing, and further optionally the steps of prehardening, neutralizing and so forth. These can be omitted accordingly. Such processing may be what is called manual processing such as tray development or frame development, or may be mechanical processing such as roller development or hanger development.

EXAMPLES

Example 1

Samples were prepared in the following way.

Film A

A biaxially oriented polyester film was coated with an aqueous dispersion of a vinylidene chloride/ethyl acrylate/itaconic acid/acrylic acid copolymer (86.6/11.1/2.0/0.3 in % by weight) in a dry coating thickness of 1.2 μm to give a film provided with a polyvinylidene chloride layer in a laminate. This is designated as film A.

Film B

A biaxially oriented polyester film was coated with an aqueous dispersion of a vinylidene chloride/ethyl acrylate/itaconic acid copolymer (60.0/38.0/2.0 in % by weight) in a dry coating thickness of 1.2 μm to give a film provided with a polyvinylidene chloride layer in a laminate. This is designated as film B.

Film C

The same film as the film A except that the polyvinylidene chloride layer was not provided was prepared. This is designated as film C.

Film D

The film D was prepared in the same way as in film A except that a butadiene/styrene/acrylic acid/itaconic acid polymer latex (copolymerization ratio: 38/54/5/3 in % by weight) was coated in a dry coating thickness of 1.2 μm, in place of the polyvinylidene chloride copolymer. This is designated as film G.

The following antistatic layer (a), (b) or (c) was provided on the above-obtained films A, B, C and G as shown in Table 1.

Antistatic layer (a) A coating solution comprised of the exemplary compound IP-1 of the present invention was coated in a thickness of 0.1 μm.

(b) A coating solution comprised of a polymer latex composed of;

| | |
|---|---|
| Polymer (A-5) | 10 g/lit. |
| Latex (B1) shown below | 4 g/lit. |
| Hardener (H1) shown below | 1.5 g/lit. | was coated in a thickness of 1 μm.

Latex (B1)

$+CH_2-CH \rightarrow_{99} (CH_2CH)_{1}$
           |
           COO($C_2H_4O)_{10}$-H
(phenyl group on first repeat unit)

Hardener (H1)

$\triangleright NCNH(CH_2)_6NHCN \triangleleft$
     ‖                ‖
     O                O (c) A coating solution comprised of a polymer latex composed of:

| | |
|---|---|
| Polymer (A-4) | 70 g/lit. |
| Latex (B2) shown below | 40 g/lit. |
| Ammonium sulfate | 0.5 g/lit. |
| Polyethylene oxide compound (molecular weight: 600) | 6.0 g/lit. |
| Hardener (H2) shown below | 12.0 g/lit. | was coated in a dry coating thickness of 1.0 μm.

Latex (B2)

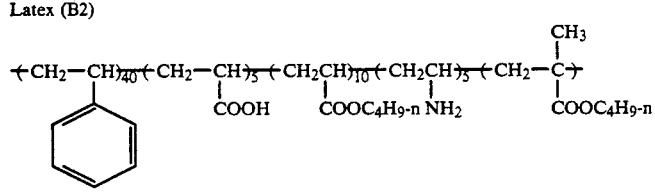

Hardener (H2)
A mixture of the following:

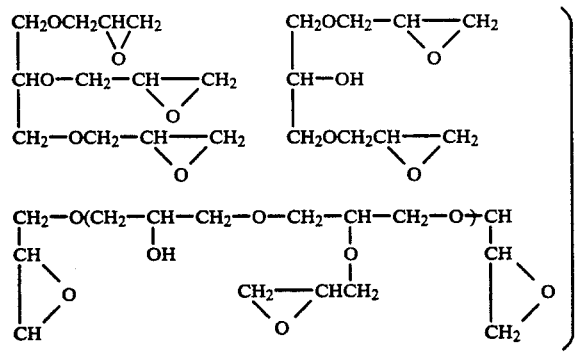

Gelatin coating solution
The laminated films each comprised of the above film antistatic layer in the combination as shown in Table 1 was coated thereon with the following coating solution in a gelatin weight of 3 g/m².

| | |
|---|---|
| Gelatin | 5 g |
| Sodium p-dodecylbenzenesulfonate | 50 mg |
| Gelatin hardener (an aqueous 1% sodium 1-oxy-3,5-dichloro-s-triaine | 5 cc |

| | |
|---|---|
| Water | 95 cc |

With regard to the samples thus prepared, adhesion was evaluated by the following method.

(1) Adhesion test:
Samples were immersed in water of 40° C. for 1 minute. Thereafter, their surfaces were scratched in a lattice pattern with a gimlet-like sharp tip, and then the scratched surfaces were rubbed to examine the state of peel-off of film surfaces.

AA: No peel-off occurred at all.
A: Peel-off slightly occurred.
B: Peel-off occurred over about a ¼ area.
C: Peel-off occurred over about a ½ area.
D: Peel-off occurred over the whole area.
Results obtained are shown in Table 1.

TABLE 1

| Sample No. | Film | Antistatic layer | Adhesion | Remarks |
|---|---|---|---|---|
| 1 | A | a | A | Y |
| 2 | " | b | A | " |
| 3 | " | c | AA | " |
| 4 | B | a | B | " |
| 5 | " | b | B | " |
| 6 | " | c | AA | " |
| 7 | C | a | CC | X |
| 8 | " | b | C | " |
| 9 | " | c | C | " |
| 10 | G | a | B | " |

Y: Present Invention, X: Comparative Example

Surface specific resistances of these samples were also measured to reveal that no particular difference was seen between i) the samples provided between the polyester base film and antistatic layer with the layer containing polyvinylidene chloride and ii) the samples not provided with the same.

With regard to Sample 10 provided with a layer of the polymer other than polyvinylidene chloride showed operability to a certain extent, but showed a deterioration of antistatic performance compared with Samples 1, 4 and 6.

EXAMPLE 2

Film D

A biaxially oriented polyester film was coated on its both sides with an aqueous dispersion of a vinylidene chloride/methyl acrylate/methyl methacrylate/acrylic acid copolymer (86.6/11.1/2.0/0.3 in % by weight) in a dry coating thickness of 0.8 μm for each side to give a film provided with polyvinylidene chloride layers in a laminate. The resulting film was provided on its one side with the antistatic layer (c) as in Example 1 in a thickness of 1.2 μm and on the other side thereof with a gelatin subbing layer having the following composition. The sample thus prepared was designated as polyester film D.

| | |
|---|---|
| Gelatin | 10 g |
| Reaction product of diethylenetriamine, adipic acid and epichlorohydrin | 0.7 g |
| Saponin | 0.1 g |
| Made up to 1 liter by adding water. | |

Film E

A biaxially oriented polyester film was provided on its both sides with the same polyvinylidene chloride layers as used in preparing the film D to give a laminate film. The laminate film was provided on its both sides with the antistatic layers (c) in a thickness of 1.2 μm each, which was designated as film E.

Film F

A biaxially oriented polyester film was provided on its both sides with the antistatic layers (c) in a thickness of 0.8 μm each, which was designated as film F.

Preparation of light-sensitive materials:

Using the above various polyester supports, light-sensitive silver halide photographic materials were prepared in the following way.

Light-sensitive material A

Using the polyester film D, the following emulsion layer and protective layer were provided on the side having no antistatic layer, and a backing layer was provided on the side having the antistatic layer. A light-sensitive material A was thus prepared.

Light-sensitive material B

A light-sensitive material B was prepared in the same manner as the light-sensitive material A except that the polyester film D was replaced with the polyester film F.

These light-sensitive materials A and B were immersed in the developing solution described below, at 30° for 1 minute. Thereafter the cross-cut adhesion test was carried out in the same manner as in Example 1.

Preparation of emulsion I

Grains containing rhodium in an amount of $10^{-5}$ mol per mol of silver were prepared by controlled double jet precipitation in an acidic environment of pH 3.0. Grains were grown in a system containing benzyladenine in an amount of 30 mg per liter of an aqueous 1 % gelatin. After silver and halide were mixed, 6-methyl-4-hydroxy-1,3,3a,7-tetraazaindene was added in an amount of 600 mg per mol of silver halide, followed by washing with water and then desalting.

Subsequently, 6-methyl-4-hydroxy-1,3,3a,7-tetraazaindene was added in an amount of 60 mg per mol of silver halide, followed by sulfur sensitization. After the sulfur sensitization, 6-methyl-4-hydroxy-1,3,3a, 7-tetraazaindene was added as a stabilizer.

Silver halide emulsion I layer

To the above emulsion, additives were added in amounts so controlled as to give the following coating weights. The above three kinds of supports (films D to F) were each coated with the resulting emulsion. An epoxy type hardener H3 was used as an emulsion layer hardener.

| | |
|---|---|
| Polymer: Styrene/butyl acrylate/acrylic acid terpolymer | 1.0 g/m² |
| Tetraphenylphosphonium chloride | 30 mg/m² |
| Saponin | 200 mg/m² |
| Polyethylene glycol | 100 mg/m² |
| Sodium dodecylbenzenesulfonate | 100 mg/m² |
| Hydroquinone | 200 mg/m² |
| Phenidone | 100 mg/m² |
| Sodium styrene sulfonate/maleic acid copolymer (Mw = 250,000) | 200 mg/m² |
| Butyl gallate | 500 mg/m² |
| 5-Methylbenzotriazole | 30 mg/m² |
| 2-Mercaptobenzimidazole-5-sulfonic acid | 30 mg/m² |
| Inert ossein gelatin (isoelectric point: 4.9) | 1.5 mg/m² |
| 1-(p-Acetylamidophenyl)-5-mercaptotetrazole | 30 mg/m² |
| Silver weight | 2.8 g/m² |
| Gelatin coating weight | 2.0 g/m² |
| Tetrazolium compound | 50 mg/m² |

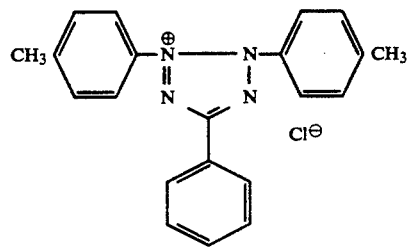

Hardener (H3)      50 mg/m²

CH₂—CH—CH₂—O—CH₂—CH₂—O—CH₂—CH—CH₂
(with epoxide O bridges at both ends)

Emulsion layer protective film I

To provide an emulsion layer protective film, a coating solution was prepared and coated to give the following coating weights.

| | |
|---|---|
| Fluorinated dioctylsulfosuccinate | 300 mg/m² |
| Matting agent: | |
| Silica (particle diameter: 8 μm) | 20 mg/m² |
| Silica (particle diameter: 3 μm) | 10 mg/m² |
| Lithium nitrate | 30 mg/m² |
| Acid-treated gelatin (isoelectric point: 7.0) | 1.2 g/m² |
| Colloidal silica | 50 mg/m² |
| Sodium styrene sulfonate/maleic acid copolymer | 100 mg/m² |
| Mordant | 30 mg/m² |

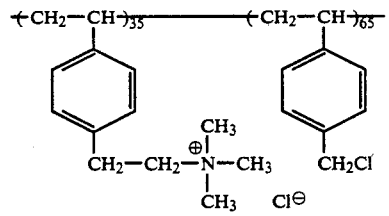

Dye    30 mg/m²

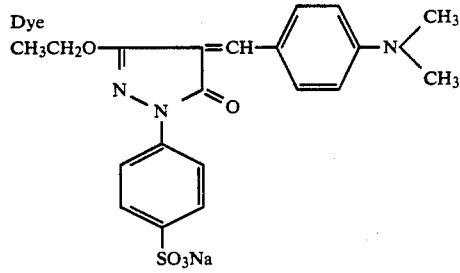

On the side opposite to the surface on which the emulsion layer was provided, each support was provided with a backing layer with the following composition, containing backing dyes. The gelatin layer was hardened using glyoxal and sodium 1-oxy3,5-dichloro-S-triazine.

Backing layer

| | |
|---|---|
| Hydroquinone | 100 mg/m² |
| Phenidone | 30 mg/m² |
| Latex polymer: Butyl acrylate/styrene copolymer | 0.5 g/m² |
| Styrene/maleic acid copolymer | 100 mg/m² |
| Citric acid | 40 mg/m² |
| Benzotriazole | 100 mg/m² |
| Sodium styrene sulfonate/maleic acid copolymer | 200 mg/m² |
| Lithium sulfate | 30 mg/m² |
| Backing dyes (a), (b) and (c) | shown below |
| Ossein gelatin | 2.0 g/m² |
| Spherical polymethyl methacrylate (average particle diameter: 5 μm) | 20 mg/m² |

(a)    40 mg/m²

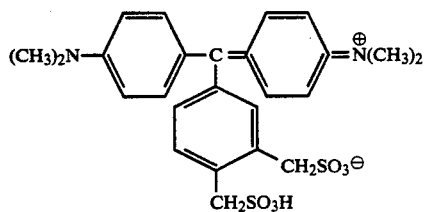

(b)  30 mg/m²

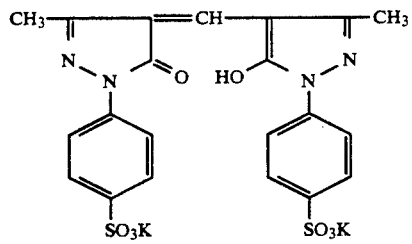

(c)  30 mg/m²

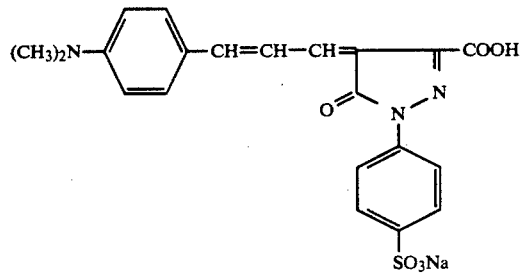

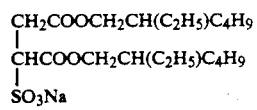  500 mg/m²

The samples, light-sensitive materials A and B, thus obtained were subjected to overall exposure, and then immersed in the following developing solution A shown below, at 30° C. for 1 minute. Thereafter, the cross-cut adhesion test was carried out in the same manner as in Example 1.

| Composition of developing solution A | |
|---|---|
| Hydroquinone | 25 g |
| 1-Phenyl-4,4-dimethyl-3-pyrazolidone | 0.4 g |
| Sodium bromide | 3 g |
| 5-Methylbenzotriazole | 0.3 g |
| 5-Nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| Made up to 1 liter by adding water. | |

The pH was controlled to be 11.5 using sodium hydroxide.

Light-sensitive material C

Using the polyester film E as a support, the following emulsion layer II and protective layer II were provided thereon. A light-sensitive material C was thus prepared.

Light-sensitive material D

Using the polyester film F as a support, the same emulsion layer and protective layer as used in the light-sensitive material C were provided thereon. A light-sensitive material D was thus prepared.

These light-sensitive materials C and D were immersed in a developing solution XD-90 (trade name; available from Konica Corporation) at 35° C. for 90 seconds. Thereafter the cross-cut adhesion test was carried out in the same manner as in Example 1.

Preparation of emulsion II

Cores comprising monodisperse silver chloroiodobromide containing 2 mol % of silver iodide and 0.2 mol % of silver chloride, having an average grain size of 0.18 μm, wire formed. On their outsides thereof, silver iodobromide layers were formed in a proportion of 40 mol % of silver iodide and 60 % of silver bromide. These grains were grown to have a grain size of 0.5 μm. Subsequently, silver iodobromide layers were grown in a proportion of 1 mol % of silver iodide and 99 mol % of silver bromide until they have a grain size of 0.85 μm. Roundish, tetradecahedral silver halide grains were thus obtained.

To these grains, chloroaurate, ammonium rhodanide, sodium thiosulfate and a thiourea compound were added to carry out chemical ripening, followed by addition of the additives shown below to make up an emulsion layer coating solution. The emulsion later coating solution was applied by simultaneous coating on both sides of each of the polyester films C and D at a coating speed of 150 m/min so as to give a silver weight of 4.8 g/m² and a gelatin weight of 1.0 g/m², followed by drying.

Emulsion layer II coating solution

| | |
|---|---|
| Per liter of the coating solution; Lime-treated ossein gelatin | 51 g |
| 5-Methyl-1,3,4,7a-tetrazaindene-7-ol | 0.8 g |
| Silver halide grains | 0.6 mol |
| SH 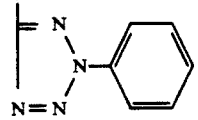 | 0.015 g |
| Nitron | 0.05 g |

-continued

| | |
|---|---|
| Fine particles of styrene-butadiene copolymer (average particle diameter: 0.03 μm) | 2.5 g |
| Gelatin hardener (sodium 1-oxy-3,5-dichloro-S-triazine) | 0.25 g |
| Polyol compound | 2.0 g |
| (Protective layer II coating solution) | |
| Per liter of the coating solution; | |
| Lime-treated inert gelatin | 68 g |
| Acid-treated gelatin | 2 g |
| $\begin{array}{c}\text{CH} \quad \text{COOC}_{10}\text{H}_{21} \\ \mid \quad \mid \\ \text{NaO}_3\text{S}-\text{CH}-\text{COOC}_5\text{H}_{11}\end{array}$ | 1 g |
| Polymethyl methacrylate (average particle diameter: 3.2 μm) | 1.1 g |
| Ludox AM (colloidal silica, produced by Du Pont) | 30 g |
| Aqueous solution (2%) of sodium 2,4-dichloro-6-hydroxy-1,3,5-triazine | 15 ml |
| Aqueous solution (35%) of formalin | 1.8 ml |
| Aqueous solution (40%) of glyoxal | 0.9 ml |

Light-sensitive material E

Using the polyester film E, the backing layer as used in the light-sensitive material A was provided on its one surface, and the emulsion layer III shown below was provided on the other surface thereof. Thus a light-sensitive material E was prepared.

Light-sensitive material F

The polyester film E used in the light-sensitive material E was replaced with the polyester film F. Thus a light-sensitive material F was prepared.

These light-sensitive materials E and F were immersed in the developing solution B described below, at 38° for 15 seconds. Thereafter the cross-cut adhesion test was carried out in the same manner as in Example 1.

Emulsion layers III

The amounts are indicated as g/m² unless particularly noted.

| | |
|---|---|
| First layer: Halation preventive layer (HC) | |
| Black colloid silver | 0.15 |
| UV absorbent (UV-1) | 0.20 |
| Colored cyan coupler (CC-1) | 0.02 |
| High-boiling solvent (OiL-1) | 0.20 |
| High-boiling solvent (OiL-2) | 0.20 |
| Gelatin | 1.6 |
| Second layer: Intermediate layer (IL-1) | |
| Gelatin | 1.3 |
| Third layer: Low-speed red-sensitive emulsion layer (R-L) | |
| Silver iodobromide emulsion (Em-1) | 0.4 |
| Silver iodobromide emulsion (Em-2) | 0.3 |
| Sensitizing dye (S-1) | $3.2 \times 10^{-4}$ (mol/mol · Ag) |
| Sensitizing dye (S-2) | $3.2 \times 10^{-4}$ (mol/mol · Ag) |
| Sensitizing dye (S-3) | $0.2 \times 10^{-4}$ (mol/mol · Ag) |
| Cyan coupler (C-1) | 0.50 |
| Cyan coupler (C-2) | 0.13 |
| Colored cyan coupler (CC-1) | 0.07 |
| DIR compound (D-1) | 0.006 |
| DIR compound (D-2) | 0.01 |
| High-boiling solvent (OiL-1) | 0.55 |
| Additive (SC-1) | 0.003 |
| Gelatin | 1.0 |
| Fourth layer: High-speed red-sensitive emulsion layer (R-H) | |
| Silver iodobromido emulsion (Em-3) | 0.9 |
| Sensitizing dye (S-1) | $1.7 \times 10^{-4}$ (mol/mol · Ag) |
| Sensitizing dye (S-2) | $1.6 \times 10^{-4}$ (mol/mol · Ag) |
| Sensitizing dye (S-3) | $0.1 \times 10^{-4}$ (mol/mol · Ag) |
| Cyan coupler (C-2) | 0.23 |
| Colored cyan coupler (CC-1) | 0.03 |
| DIR compound (D-2) | 0.02 |
| High-boiling solvent (OiL-1) | 0.25 |
| Additive (SC-1) | 0.003 |
| Gelatin | 1.0 |
| Fifth layer: Intermediate layer (IL-2) | |
| Gelatin | 0.8 |
| Sixth layer: Low-speed green-sensitive emulsion layer (G-L) | |
| Silver iodobromide emulsion (Em-1) | 0.6 |
| Silver iodobromide emulsion (Em-2) | 0.2 |
| Sensitizing dye (S-4) | $6.7 \times 10^{-4}$ (mol/mol · Ag) |
| Sensitizing dye (S-5) | $0.8 \times 10^{-4}$ (mol/mol · Ag) |
| Magenta coupler (M-1) | 0.17 |
| Magenta coupler (M-2) | 0.43 |
| Colored magenta coupler (CM-1) | 0.10 |
| DIR compound (D-3) | 0.02 |
| High-boiling solvent (OiL-2) | 0.70 |
| Additive (SC-1) | 0.003 |
| Gelatin | 1.0 |
| Seventh layer: High-speed green-sensitive emulsion layer (G-H) | |
| Silver iodobromide emulsion (Em-3) | 0.9 |
| Sensitizing dye (S-6) | $1.1 \times 10^{-4}$ (mol/mol · Ag) |
| Sensitizing dye (S-7) | $2.0 \times 10^{-4}$ (mol/mol · Ag) |
| Sensitizing dye (S-8) | $0.3 \times 10^{-4}$ (mol/mol · Ag) |
| Magenta coupler (M-1) | 0.03 |
| Magenta coupler (M-2) | 0.13 |
| Colored magenta coupler (CM-1) | 0.04 |
| DIR compound (D-3) | 0.004 |
| High-boiling solvent (OiL-2) | 0.35 |
| Additive (SC-1) | 0.003 |
| Gelatin | 1.0 |
| Eighth layer: Yellow filter layer (YC) | |
| Yellow colloid silver | 0.1 |
| Additive (HS-1) | 0.07 |
| Additive (HS-2) | 0.07 |
| Additive (SC-2) | 0.12 |
| High-boiling solvent (OiL-2) | 0.15 |
| Gelatin | 1.0 |
| Ninth layer: Low-speed blue-sensitive emulsion layer (B-L) | |
| Silver iodobromide emulsion (Em-1) | 0.25 |
| Silver iodobromide emulsion (Em-2) | 0.25 |
| Sensitizing dye (S-9) | $5.8 \times 10^{-4}$ (mol/mol · Ag) |
| Yellow coupler (Y-1) | 0.60 |
| Yellow coupler (Y-2) | 0.32 |
| DIR compound (D-1) | 0.003 |
| DIR compound (D-2) | 0.006 |
| High-boiling solvent (OiL-2) | 0.18 |
| Additive (SC-1) | 0.004 |
| Gelatin | 1.3 |
| Tenth layer: High-speed blue-sensitive emulsion layer (B-H) | |
| Silver iodobromide emulsion (Em-4) | 0.5 |
| Sensitizing dye (S-10) | $3.0 \times 10^{-4}$ (mol/mol · Ag) |
| Sensitizing dye (S-11) | $1.2 \times 10^{-4}$ (mol/mol · Ag) |
| Yellow coupler (Y-1) | 0.18 |
| Yellow coupler (Y-2) | 0.10 |
| High-boiling solvent (OiL-2) | 0.05 |
| Additive (SC-1) | 0.002 |
| Gelatin | 1.0 |
| Eleventh layer: First protective layer (PRO-1) | |
| Silver iodobromide emulsion (Em-5) | 0.3 |
| Ultraviolet absorbent (UV-1) | 0.07 |
| Ultraviolet absorbent (UV-2) | 0.1 |
| Additive (HS-1) | 0.2 |
| Additive (HS-2) | 0.1 |
| High-boiling solvent (OiL-1) | 0.07 |
| High-boiling solvent (OiL-3) | 0.07 |
| Gelatin | 0.8 |
| Twelfth layer: Second protective layer (PRO-2) | |
| Alkali-soluble matting agent (average particle diameter: 2 μm) | 0.13 |
| Polymethyl methacrylate | 0.02 |

-continued

| (average particle diameter: 3 μm) | |
|---|---|
| Sliding agent (WAX-1) | 0.04 |
| Static control agent (SU-1) | 0.004 |
| Static control agent (SU-2) | 0.02 |
| Gelatin | 0.5 |

In addition to the above components, coating aid SU-4, dispersing agent SU-3, hardeners H-1 and H-2, stabilizer ST-1, antiseptic agent DI-1, antifoggants AF-1 and AF-2, and dyes AI-1 and AI-2 were added to each layer accordingly.

The emulsions used in the above samples are those shown below. All of them are inside iodine-rich monodisperse emulsions.

Em-1: Average AgI content of 7.5 mol%; octahedral. Grain size: 0.55 μm

EM-2: Average AgI content of 2.5 mol %; octahedral. Grain size: 0.36 μm

Em-3: Average AgI content of 8.0 mol %; octahedral. Grain size: 0.84 μm

Em-4: Average AgI content of 8.5 mol %; octahedral. Grain size: 1.02 μm

Em-4: Average AgI content of 2.0 mol %; octahedral. Grain size: 0.08 μm

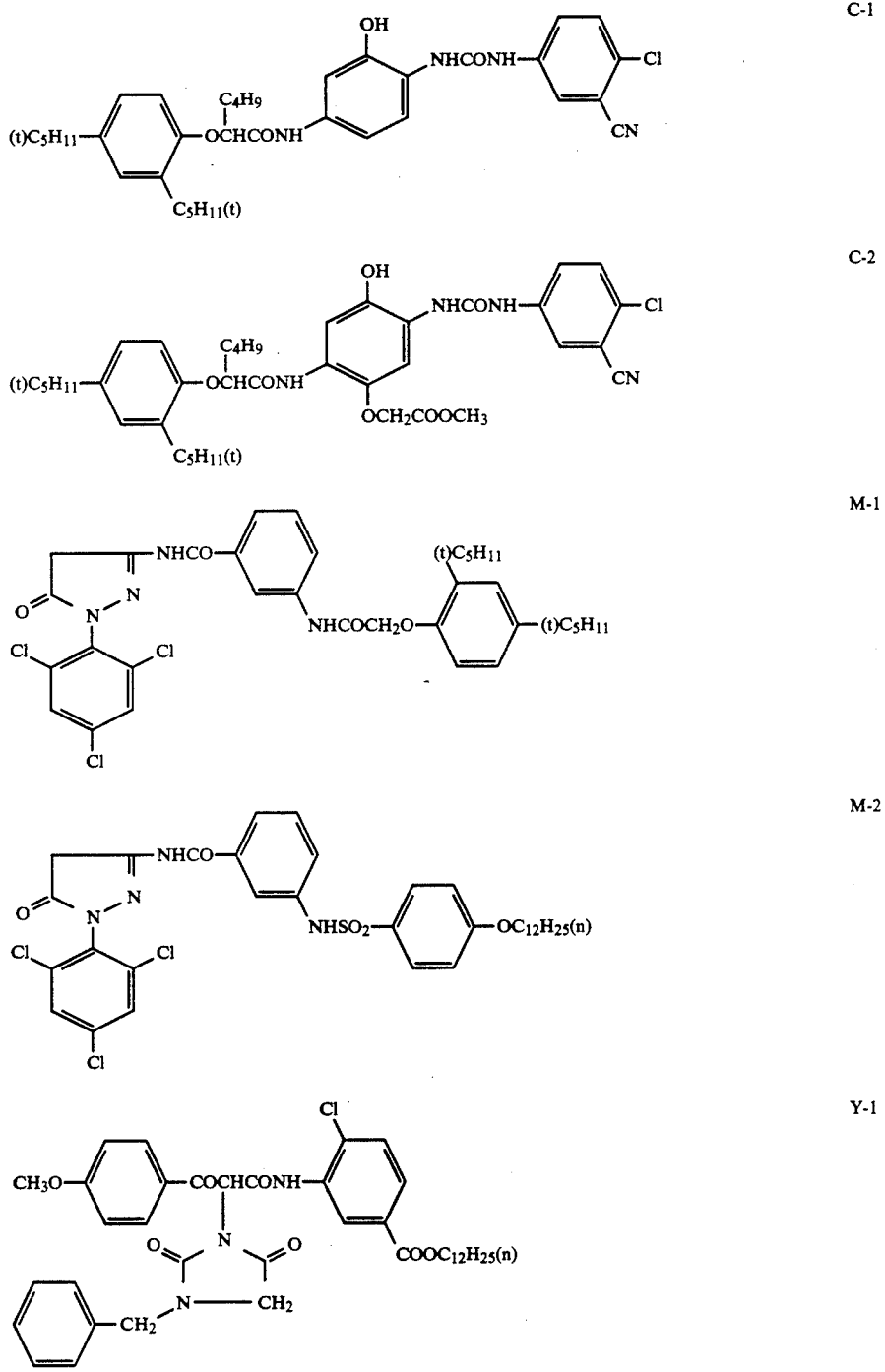

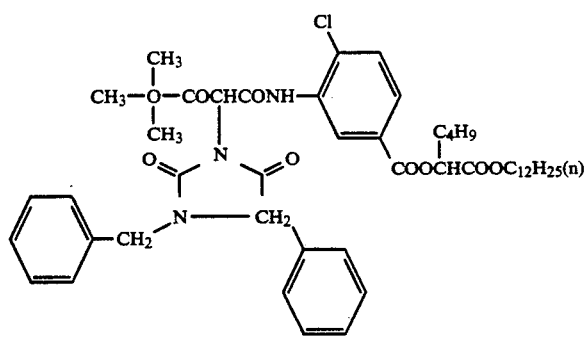
Y-2
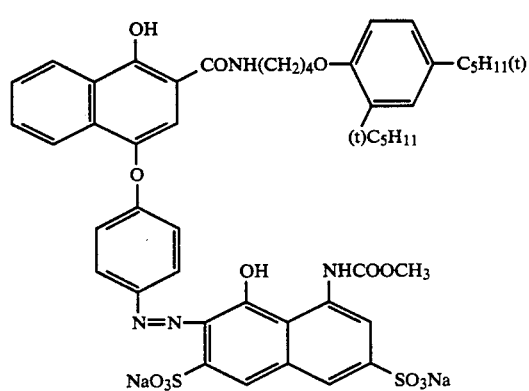
CC-1
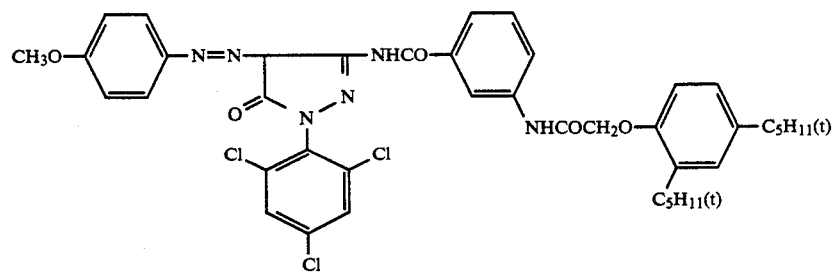
CM-1
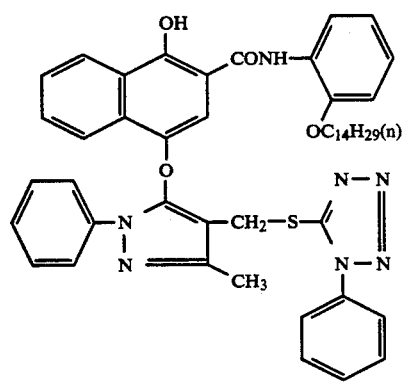
D-1

-continued
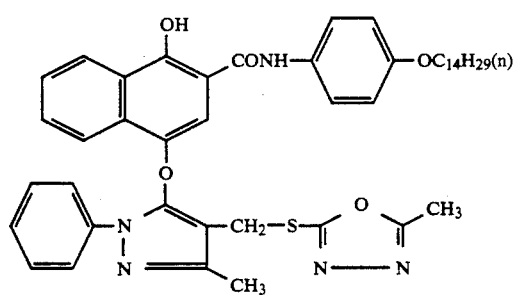
D-2
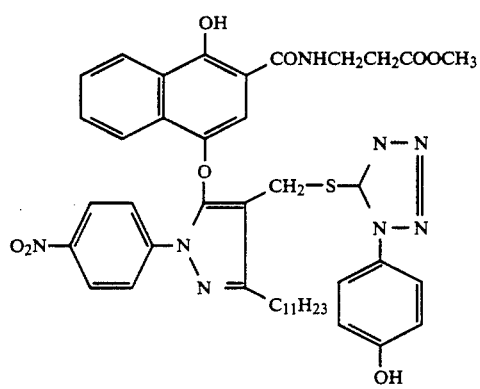
D-3
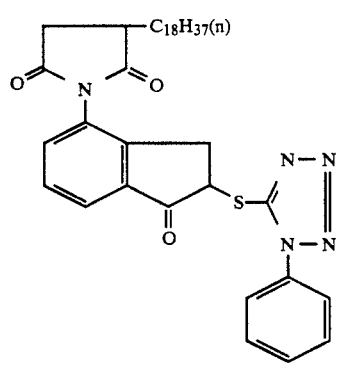
D-4
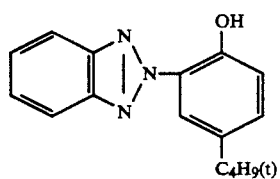
UV-1
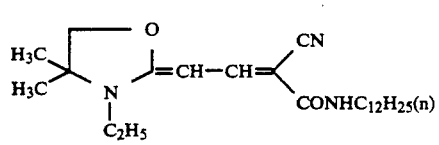
UV-2

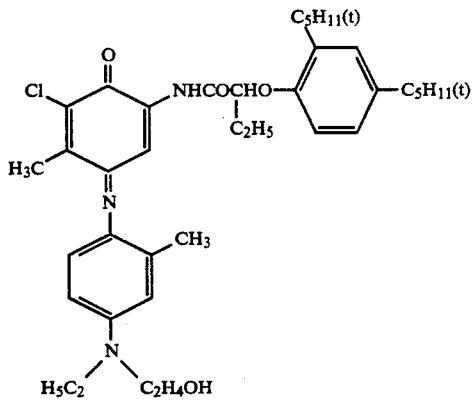
F-1
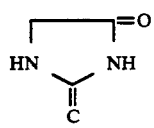
HS-1
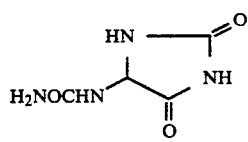
HS-2
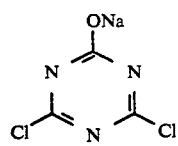
H-1
[(CH$_2$=CHSO$_2$CH$_2$)$_3$CCH$_2$SO$_2$(CH$_2$)$_2$]$_2$N(CH$_2$)$_2$SO$_3$K    H-2
Su-1
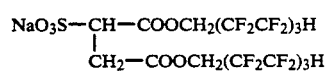
Su-2
(Alkanol XC)
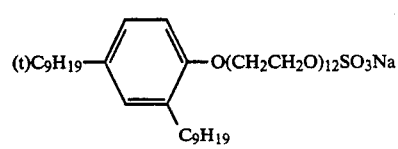
Su-3
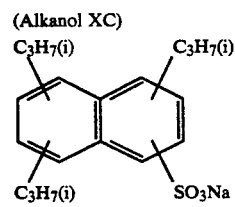
Su-4
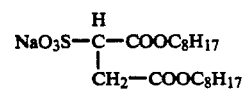
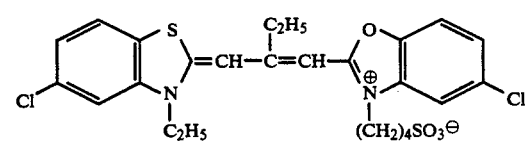
S-1

-continued
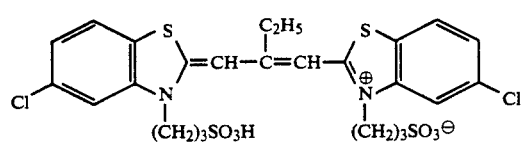
S-2
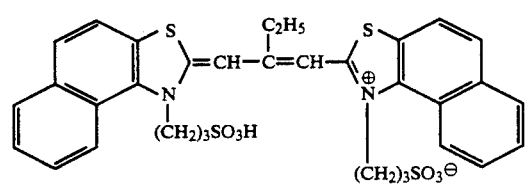
S-3
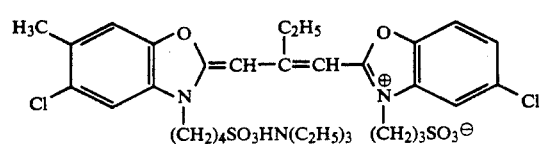
S-4
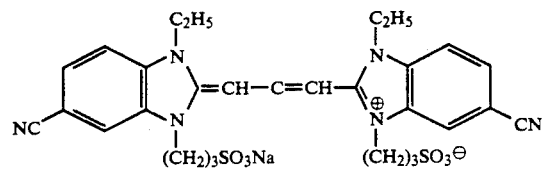
S-5
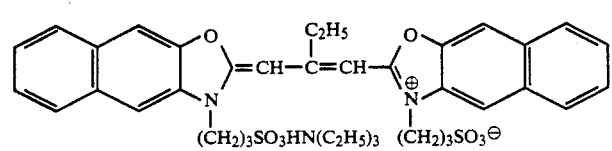
S-6
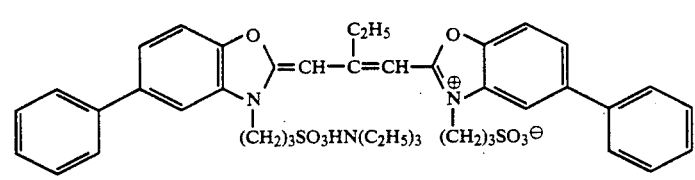
S-7
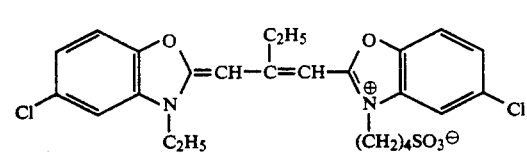
S-8
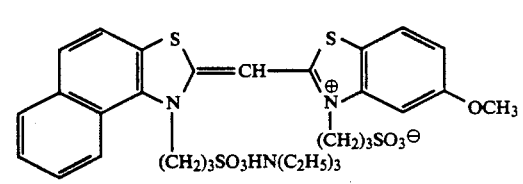
S-9
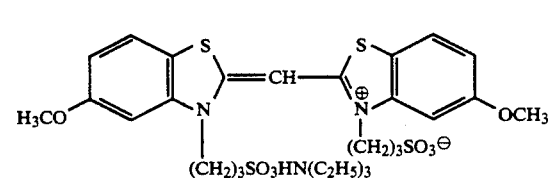
S-10

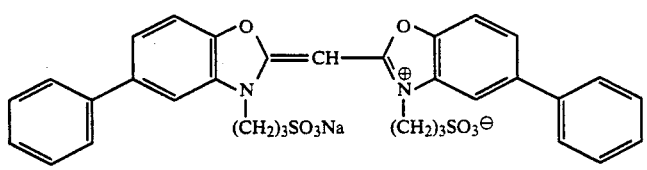
S-11
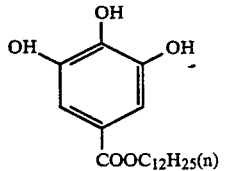
Sc-1
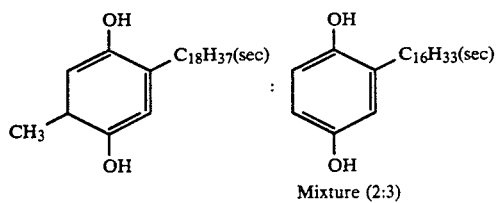
Sc-2
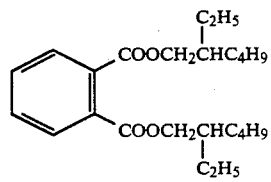
Oil-1
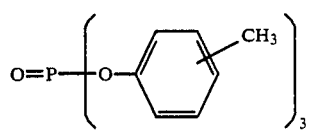
Oil-2
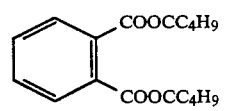
Oil-3
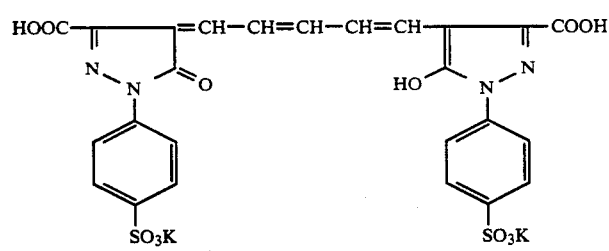
AI-1
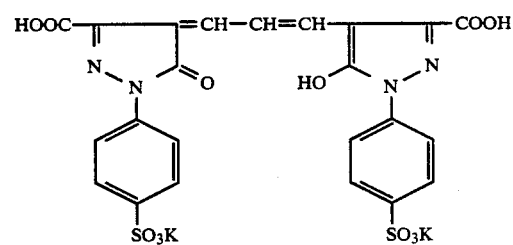
AI-2
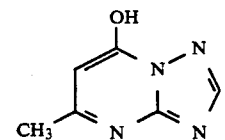
ST-1

Mixture of

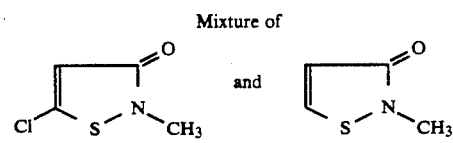

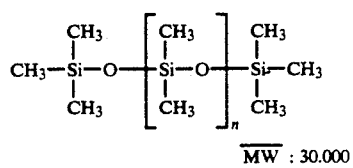

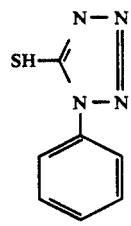

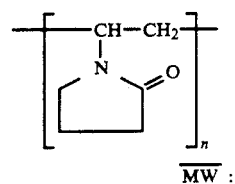

Color developing solution B

| | |
|---|---|
| 4-Amino-3-methyl-N-ethyl-N-(β-hydroxyethyl)aniline. hydrochloride | 4.75 g |
| Anhydrous sodium sulfite | 4.25 g |
| Hydroxylamine.½-sulfate | 2.0 g |
| Anhydrous potassium carbonate | 37.5 g |
| Sodium bromide | 1.3 g |
| Nitrilotriacetic acid.trisodium salt (monohydrate) | 2.5 g |
| Potassium hydroxide | 1.0 g |
| Made up to 1 liter by adding water (pH 10.1) | |

On the light-sensitive materials thus prepared, film cross-cut adhesion tests were carried out to reveal the following:

Among the light-sensitive materials A, B, C, D, E and F, peel-off on the surface having the antistatic layer little occurred in A, C and E; and occurred in B, D and F. This shows that the peel-off can be well prevented when the polyvinylidene chloride layer is provided between the support and antistatic layer.

No difference was seen in antistatic performance between A and B, C and D, and E and F.

As is evident from the results of Examples 1 and 2, the film according to the present invention, having antistatic properties, have a superior adhesion particularly also when hydrophilic layers are further laminated end they come into contact with, or ere processed with, aqueous solutions. Hence, the present invention can be well effective when applied to light-sensitive silver halide photographic materials or the like.

As having been described above, the present invention has made it possible to provide a plastic film capable of maintaining a good adhesion as a support for hydrophilic layers and also having a superior antistatic properties.

DI-1

WAX-1

AF-1

AF-2

What is claimed is:

1. A plastic film comprising a plastic base film and provided thereon a layer containing a polyvinylidene chloride and an antistatic layer containing an ionic polymeric compound in that order, wherein the ionic polymeric compound is a polymer having a structure unit represented by the following Formula I, II-A or II-B:

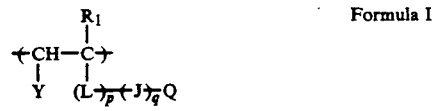

Formula I wherein $R_1$ represents an alkyl group having 1 to 4 carbon atoms, a hydrogen atom, a halogen atom or —CH₂COOM; Y represents a hydrogen atom or —COOM, wherein M represents a hydrogen atom or a cation; L represents —CONH—, —COO—, —CO— or —O—; J represents an alkylene group having 1 to 12 carbon atoms, an arylene group, an arylenealkylene group or an alkylenearylene group; Q represents an ionic group; and p and q each represent 0 or 1;

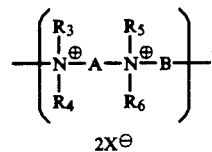

Formula II-A

Formula II-B

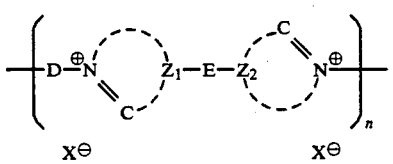

wherein $R_3$, $R_4$, $R_5$, and $R_6$ each represent an alkyl group having 1 to 4 carbon atoms, provided that $R_4$ and $R_6$ may bond together to form a nitrogen-containing hetero cyclic ring; A, B and D each represent an alkylene group having 2 to 10 carbon atoms, an arylene group, an alkenylene group, an arylenealkylene group, an alkylenearylene group, —$R_7COR_8$—, —$R_9COOR_{10}OCOR_{11}$—, —$R_{12}OCOR_{13}COOR_{14}$, —$R_1$—($OR_{16}$)$_m$—, —$R_{17}CONHR_{18}NHCOR_{19}$—, —$R_2$-$OCONHR_{21}NHCOR_{22}$—, —$R_{23}NHCONHR_{24}NHCONHR_{25}$— wherein $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represent an alkyl group, $R_{10}$, $R_{13}$, $R_{14}$, $R_{21}$ and $R_{24}$ each represent an alkylene group, an arylene group, an alkenylene group, an arylenealkylene group, an alkylenearylene group, and m represents an integer of 1 to 4; E represents an alkylene group having 2 to 10 carbon atoms, an arylene group, an alkenylene group, an arylenealkylene group, an alkylenearylene group, —$R_7COR_8$—, —$R_8$-$COOR_{10}OCOR_{11}$—, —$R_{12}OCOR_{13}COOR_{14}$, —$R_{15}$—($OR_{16}$)m—, —$R_{17}CONHR_{18}NHCOR_{19}$—, —$R_2$-$OCONHR_{21}NHCOR_{22}$—, —$R_{23}$ $NHCONHR_{24}NHCONHR_{25}$—, —$NHCOR_{26}CONH$— wherein $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represent an alkyl group, $R_{10}$, $R_{13}$, $R_{14}$, $R_{21}$, $R_{24}$ and $R_{26}$ each represent an alkylene group, an arylene group, an alkenylene group, an arylenealkylene group, an alkylenearylene group, and m represents an integer of 1 to 4; $Z_1$ and $Z_2$ represent a non-metallic atomic group necessary to form a 5 or 6 membered ring together with —N=C—; X represents an anion; and n represents an integer of 5 to 300.

2. The plastic film of claim 1, wherein the polyvinylidene chloride is a copolymer having 70 to 99.5% by weight of vinylidene chloride in its structure.

3. The plastic film of claim 1, wherein the polyvinylidene chloride is a copolymer having 85 to 99% by weight of vinylidene chloride in its structure.

4. The plastic film of claim 1, wherein the polyvinylidene chloride is a vinylidene chloride/alkyl acrylate/itaconic acid copolymer.

5. The plastic film of claim 1, wherein the polyvinylidene chloride is a vinylidene chloride/alkyl acrylate/acrylic acid copolymer.

6. The plastic film of claim 1, wherein the polyvinylidene chloride is a vinylidene chloride/ethyl acrylate/itaconic acid copolymer.

7. The plastic film of claim 1, wherein the polyvinylidene chloride is a vinylidene chloride/ethyl acrylate/itaconic acid/acrylic acid copolymer.

8. The plastic film of claim 1, wherein the polyvinylidene chloride is a vinylidene chloride/methyl acrylate/methyl methacrylate/acrylic acid copolymer.

9. The plastic film of claim 1, wherein the content of the ionic polymeric compound in the antistatic layer is 0.005 to 2.0 g/m$_2$.

10. The plastic film of claim 9, wherein the ionic polymer compound is a compound represented by one of the following formulae:

IP-1
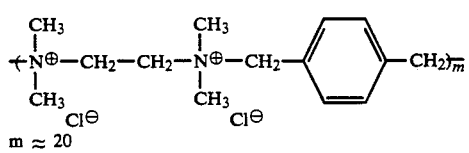
m ≈ 20

IP-2
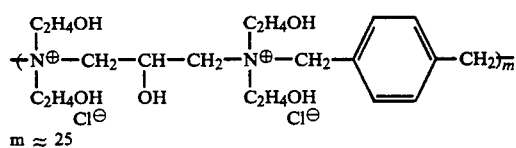
m ≈ 25

IP-3
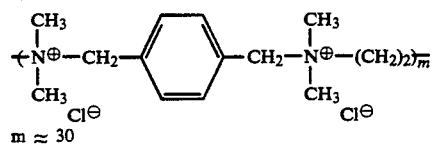
m ≈ 30

IP-4
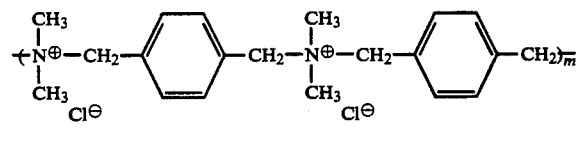
m ≈ 10

IP-5
m ≈ 75

-continued
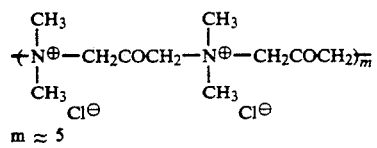  IP-6
m ≈ 5
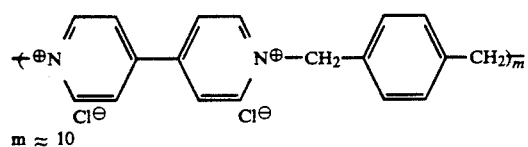  IP-7
m ≈ 10
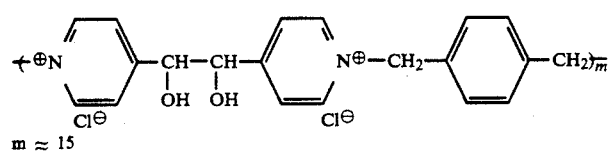  IP-8
m ≈ 15
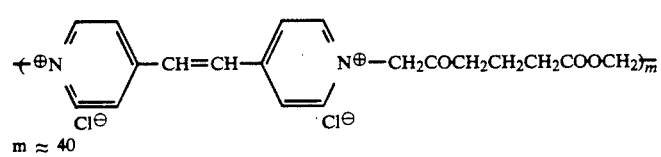  IP-9
m ≈ 40
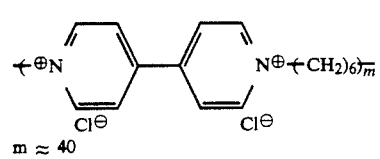  IP-10
m ≈ 40
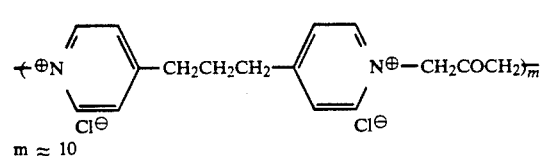  IP-11
m ≈ 10
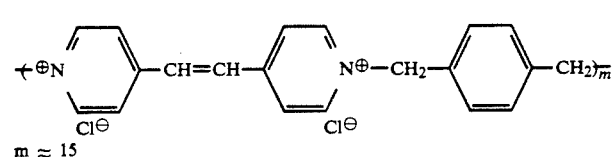  IP-12
m ≈ 15
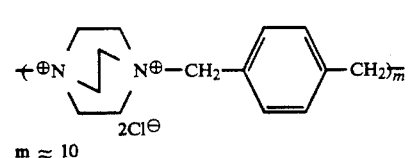  IP-13
m ≈ 10
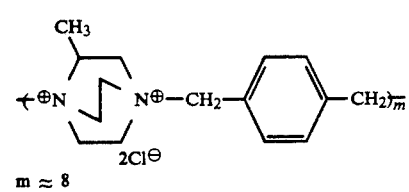  IP-14
m ≈ 8
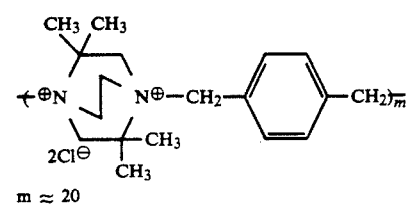  IP-15
m ≈ 20

-continued
IP-16
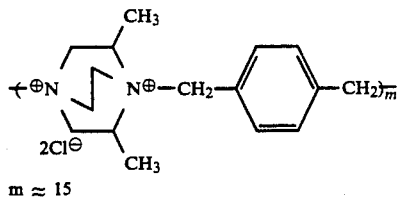
m ≈ 15
IP-17
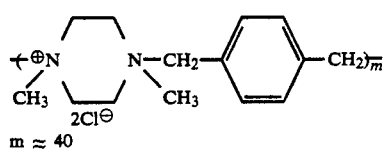
m ≈ 40
IP-18
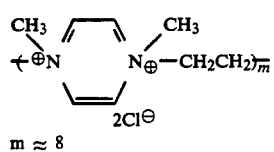
m ≈ 8
IP-19
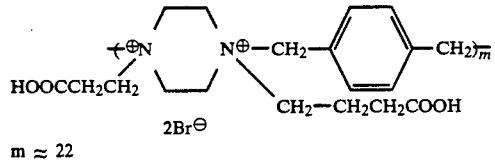
m ≈ 22
IP-20
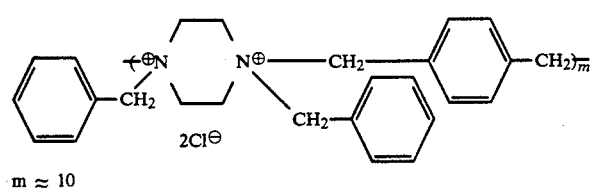
m ≈ 10
IP-21
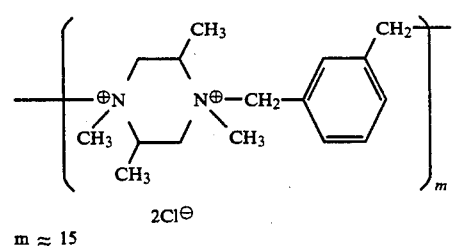
m ≈ 15
11. The plastic film of claim 10, wherein the ionic polymer compound is a compound represented by one of the following formulae, wherein Mn is the number average molecular weight expressed by a value measured by GPC, in terms of polyethylene glycol:
IP-22
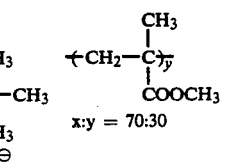
x:y = 70:30
IP-23
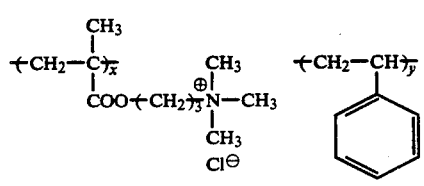
x:y = 60:40

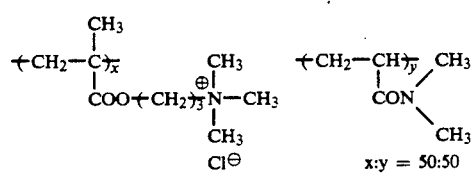
IP-24
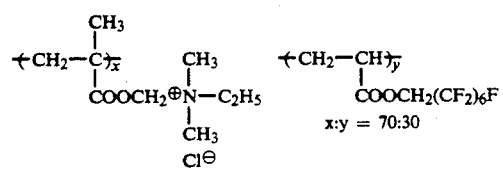
IP-25
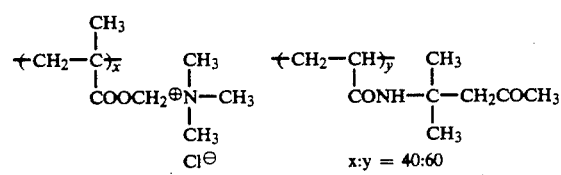
IP-26
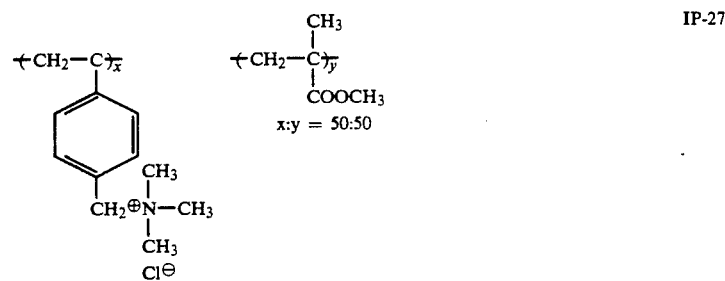
IP-27
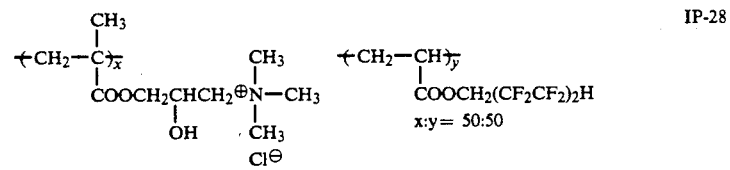
IP-28
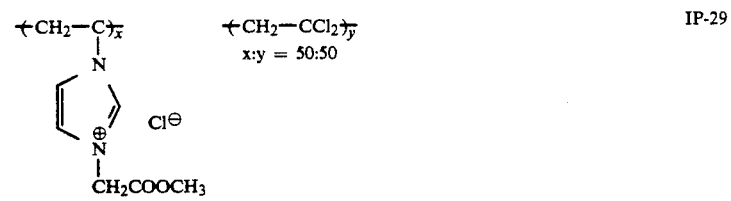
IP-29
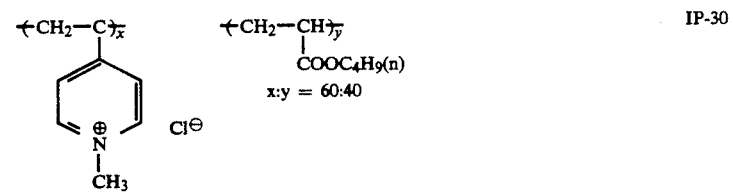
IP-30
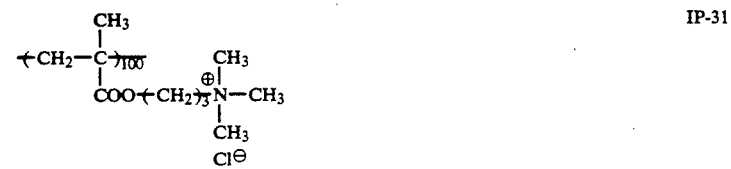
IP-31

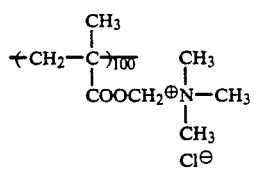 IP-32
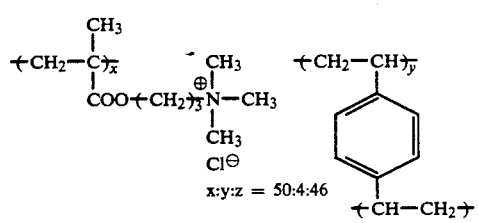 IP-33
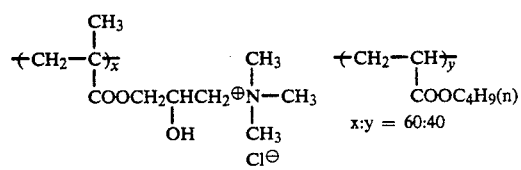 IP-34
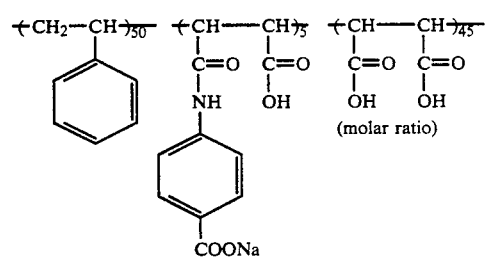 IP-35
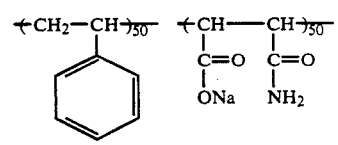 IP-36
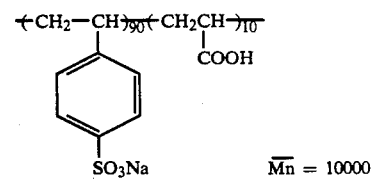 A-1
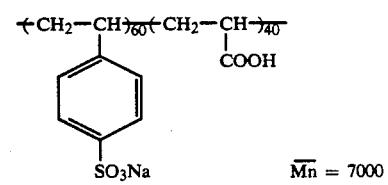 A-2
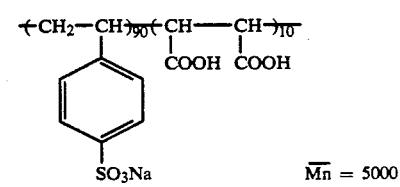 A-3

-continued
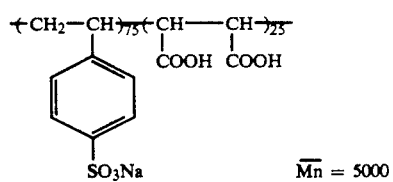 A-4
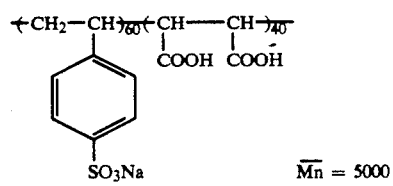 A-5
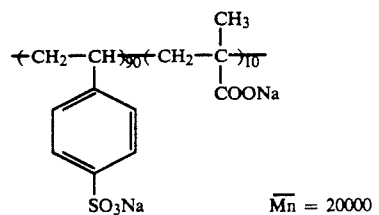 A-6
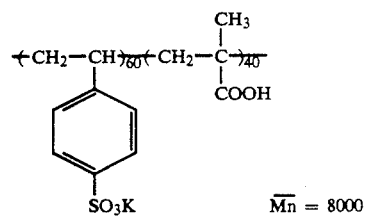 A-7
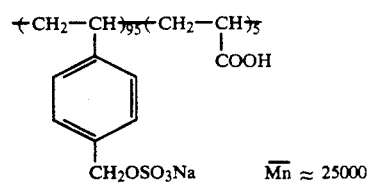 A-8
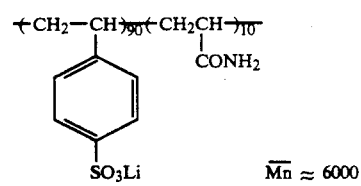 A-9
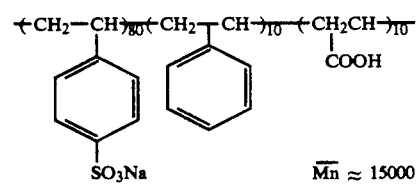 A-10
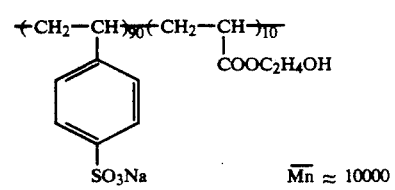 A-11

-continued
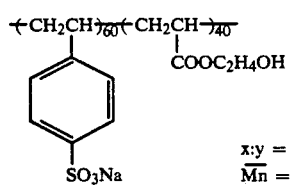 A-12
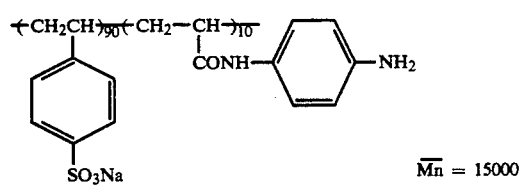 A-13
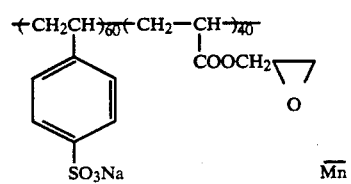 A-14
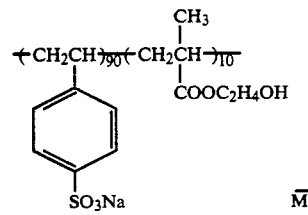 A-15
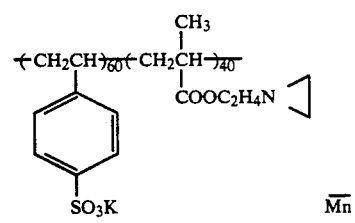 A-16
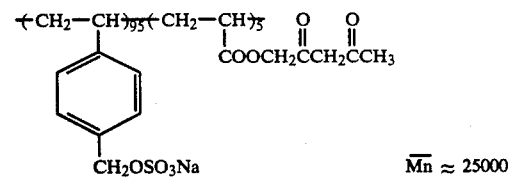 A-17
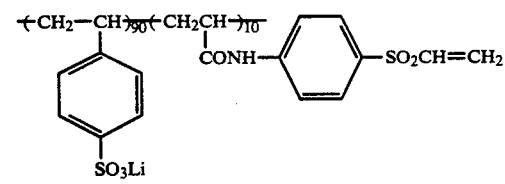 A-18
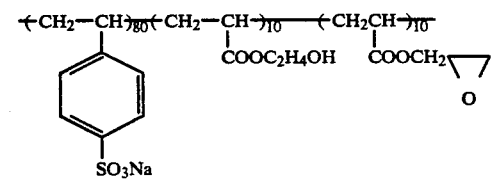 A-19

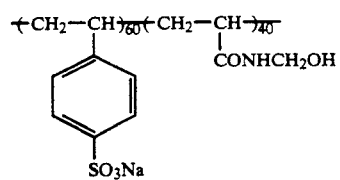
A-20
$\overline{Mn} \approx 10000.$